US007396564B2

(12) United States Patent  
Tai et al.

(10) Patent No.: US 7,396,564 B2
(45) Date of Patent: Jul. 8, 2008

(54) METHOD AND APPARATUS FOR CONTROLLING THE LENGTH OF A CARBON NANOTUBE

(75) Inventors: Hung-Ming Tai, Hsinchu (TW); Nang-Chian Shie, Taichung (TW); Tsan-Lin Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 762 days.

(21) Appl. No.: 10/614,106

(22) Filed: Jul. 8, 2003

(65) Prior Publication Data

US 2004/0126491 A1 Jul. 1, 2004

(30) Foreign Application Priority Data

Dec. 30, 2002 (TW) ............................... 91137890 A

(51) Int. Cl.
C23C 16/00 (2006.01)
B05D 1/40 (2006.01)
B05D 3/00 (2006.01)

(52) U.S. Cl. .................. 427/249.1; 427/248.1; 427/331; 427/255.11

(58) Field of Classification Search ........................ None
See application file for complete search history.

(56) References Cited

U.S. PATENT DOCUMENTS 5,591,312 A * 1/1997 Smalley ................. 204/157.41
6,146,227 A 11/2000 Mancevski ................... 445/24
6,346,189 B1 2/2002 Dai et al. ..................... 205/766
6,719,602 B2 * 4/2004 Nakayama et al. ............ 445/50

OTHER PUBLICATIONS

Jason H. Hafner et. al., *The Journal Of Physical Chemistry B*, vol. 105, No. 4, Feb. 1, 2001, pp. 743-746.
Liesbeth C. Venema et. al., *Length control of individual carbon nanotubes by nanostructuring with a scanning tunneling microscope*, Appl. Phys. Lett. 71 (18), Nov. 3, 1997, pp. 2629-2631.

* cited by examiner

*Primary Examiner*—Timothy Meeks
*Assistant Examiner*—Kelly M Stouffer
(74) *Attorney, Agent, or Firm*—Bacon & Thomas, PLLC

(57) ABSTRACT

This invention relates to a method and apparatus for controlling the length of a carbon nanotube, in cooperation with a substrate having at least one reference level on a surface of the substrate on which at least one carbon nanotube is formed, comprising at least one positioning platform for mounting and calibrating the substrate; a discharging electrode mounted on one side of the positioning platform to cut the carbon nanotube wherein the position of the discharging electrode can be calibrated with the positioning platform; a piezoelectric actuator for calibrating the position of the discharging electrode or the height of the discharging electrode relative to the substrate reference level; a position sensor for detection of the height of the substrate; and a voltage pulse supplying means for applying a voltage pulse to the discharging electrode to cut the carbon nanotube.

9 Claims, 3 Drawing Sheets

METHOD AND APPARATUS FOR CONTROLLING THE LENGTH OF A CARBON NANOTUBE

BACKGROUND OF THE INVENTION

1. Field of the Invention

The present invention relates to a method and apparatus for controlling the length of a carbon nanotube. In particular, the present invention relates to a method and apparatus suitable for modifying the tip of a carbon nanotube probe, a carbon nanotube sensor or a carbon nanotube field emitter.

2. Description of Related Art

Carbon nanotubes are used widely and an example of such use is as probe tips for scanning probe microscopes (SPMs), measurement of the mass of nano particulars or sensors for detection of whether atoms or molecules exist. A probe microscopic cantilever can be made by the current microelectromechanical technology. An array of probes having carbon nanotube tips can be formed on a p-type wafer, an n-type wafer, a glass substrate or the like substrate by chemical vapor deposition (CVD), plasma-enhanced chemical vapor deposition (PECVD) or field-enhanced chemical vapor deposition (FECVD). This is exemplified by U.S. Pat. No. 6,146,227, which provides an advantageous solution for mass-production of SPM probes by disclosing a process for growing a carbon nanotube on a probe tip. In addition, U.S. Pat. No. 6,346,189 issued to Dai et al. in 2002 disclosed an atomic force microscopic probe to have a catalyst disposed on its probe tip on which a carbon nanotube is grown by CVD.

Although recent research has focused on the growth of the carbon nanotubes, a number of problems remain in reference to obtaining carbon nanotubes of uniform quality. Taking the length of the carbon nanotubes as an example, a control of time for growing the carbon nanotubes does not necessarily mean that the length of the tip extending from the carbon nanotubes can be adequately controlled. This is because the positional control of the catalyst particles is difficult, for example, the catalyst particles may not be formed on the end of the probe tip. Thus, carbon nanotubes grown by CVD are of different lengths extending from the probe. On the other hand, the carbon nanotubes grown adhere to the surface of the probe by van der Waal's force, and then, crawl along the slant surface of the probe tip. When the internal force of the carbon nanotubes is larger than the adherent force between the carbon nanotubes and the surface of the probe, the carbon nanotubes extend from the probe tips. Therefore, the length of the probe tips formed under the same condition and the same procedure will vary. The carbon nanotubes of non-uniform length cause a number of problems in practice. For example, a lengthy SPM tip tends to be effected by thermal disturbance and results in vibration, though it is instrumental to the probation of a deeper microstructure. Also, the lengthy carbon nanotube tip tends to cause buckling. If the length of the tip is used inappropriately, the outcome of scan will vary. As a result, the accuracy of size measurement of a sample object is lessened, reducing the effect of the carbon nanotube probes. Moreover, as application is made to measure the mass of the nano particles, small particles adhere to the end of the carbon nanotubes having a rigidly mounted end and a free end. Since the length of the carbon nanotubes has an effect on the vibration condition of the carbon nanotubes, the mass of the nano particles is measured based on the specific resonance frequency of a carbon nanotube structure corresponding to the specific length of the carbon nanotubes. As for the application to serve as a sensor for detection of whether atoms or molecules exist, a carbon nanotube having organic functions is used to catch chemical materials. Hence, it is necessary to adequately control the length of the carbon nanotube sensor tip, to make the sensor to function well. Furthermore, the carbon nanotubes having the catalyst particles at the end probably effects field emission of electrons. Hence, the researchers for the field emission of electrons also care about innovations on methods for cutting the catalyst particles at the end of the carbon nanotubes.

In recent years, several efforts working on the length-controlling of carbon nanotubes are reported. For example, cutting a carbon nanotube through the assistance of a voltage pulse between the tip of the scanning tunneling microscope (STM) and a single nanotube is described by Liesbeth et al. (Liesbeth et al., Applied Physics Letters, Vol.71, No.18, 1997). Another method for controlling the length of a single carbon nanotube is also disclosed by Hafner et al. (Hafner et al., The Journal of Physical Chemistry B, Vol. 105, No. 4, 2001). The single carbon nanotube is picked up and adhered to a tip of single-walled carbon nanotubes through the assistance of UV-cure adhesive first in Hafner's method. Then a voltage pulse is applied to the tip for cutting the carbon nanotube. However, all these methods illustrated above need to be achieved through a complex process or expensive apparatus.

It is necessary for the conventional techniques to control the length of the carbon nanotube tips by going through the processing steps for every probe. Both the complex processing steps and expensive apparatus prevent high-quality carbon nanotubes from popularization in the industry. Absent supply of the carbon nanotube probes retards the development of researches and applications of nano-scale measurement. Furthermore, even though several complex methods for cutting a single carbon nanotube are disclosed, no simple method or cheap apparatus for mass-producing the carbon nanotubes with uniform length is disclosed.

SUMMARY OF THE INVENTION

The primary object of the present invention is to provide a method for controlling the length of the carbon nanotubes so as to control and calibrate the length of the carbon nanotubes, improve the manufacture efficiency and quality of the carbon nanotube sensors, SPM probes or field emitting elements.

Another object of the present invention is to provide an apparatus for controlling the length of the carbon nanotubes so as to control and calibrate the length of the carbon nanotubes, improve the manufacture efficiency and quality of the carbon nanotube sensors, SPM probes or field emitting elements.

To attain the above-mentioned objects, a method for controlling the length of a carbon nanotube according to the present invention comprises the following steps: providing a substrate having at least a reference level on the surface of the substrate on which at least one carbon nanotube is formed, wherein the shortest vertical distance between the top of the carbon nanotube and the reference level is H; providing at least one positioning platform capable of carrying and moving the substrate; mounting the substrate onto the positioning platform; providing a discharging electrode and a piezoelectric actuator which positions the discharging electrode; providing a position sensor for detection of the height of the discharging electrode relative to the reference level to calibrate the position of the substrate or the discharging electrode in accordance with the height sensed with the position sensor, wherein the vertical distance from the discharging electrode to the reference level is I; and moving the substrate with the positioning platform and simultaneously applying a voltage pulse to the discharging electrode to cut the carbon nanotube; wherein H is not less than I.

To achieve the aforesaid objects, an apparatus for controlling the length of a carbon nanotube according to the present invention, in cooperation with a substrate having at least one reference level on a surface of the substrate on which at least one carbon nanotube is formed, comprises at least one positioning platform for mounting and calibrating the substrate; a discharging electrode mounted on one side of the positioning platform to cut the carbon nanotube wherein the position of the discharging electrode can be calibrated with the positioning platform; a piezoelectric actuator for calibrating the position of the discharging electrode or the height of the discharging electrode relative to the substrate reference level; a position sensor for detection of the height of the substrate; and a voltage pulse supplying means for applying a voltage pulse to the discharging electrode to cut the carbon nanotube.

Preferably, the positioning platform used in the method and apparatus for controlling the length of a carbon nanotube according to the present invention is an XY-dimensional positioning platform and a Z-dimensional positioning platform to calibrate the position of the substrate or of the discharging electrode. Preferably, the substrate used in the method and apparatus for controlling the length of a carbon nanotube according to the present invention is a silicon wafer substrate on which the carbon nanotube is formed by CVD, PECVD or FECVD. Preferably, the discharging electrode used in the method and apparatus for controlling the length of a carbon nanotube according to the present invention is a planar or a wire electrode. It is preferable for the discharging electrode to have an angle in the range of from zero to 15 degrees with respect to the substrate surface. Preferably, in the method and apparatus for controlling the length of a carbon nanotube according to the present invention, the voltage pulse applied to the discharging electrode is in the range of from 3.6 volts to 20 volts, and the period of the voltage pulse is in the range of from 30 to 100 microseconds. Preferably, the position sensor used in the method and apparatus for controlling the length of a carbon nanotube according to the present invention is an interferometer, a capacitance-type sensor or a probe-type sensor. In cutting the carbon nanotube, the vertical distance between the discharging electrode and the reference level is preferably not larger than the shortest vertical distance between the top of the carbon nanotube and the reference level.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
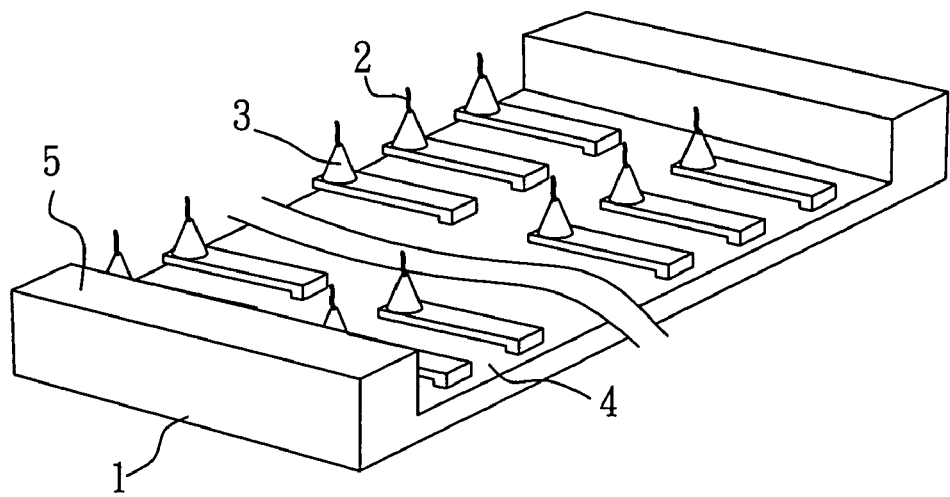
FIG. 1 is a perspective view of a substrate according to the preferred embodiment of the present invention.
Figure 2A:
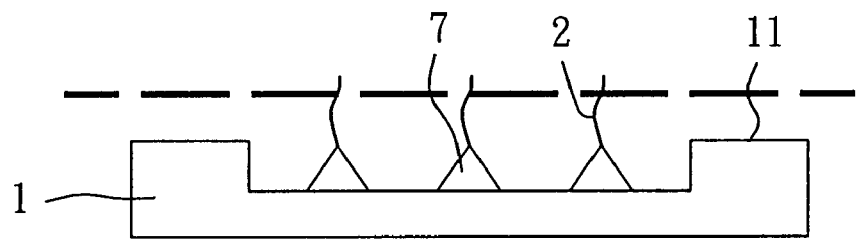
FIGS. 2(a) and 2(b) are cross-sectional views of a substrate according to the preferred embodiment of the present invention.
Figure 2B:
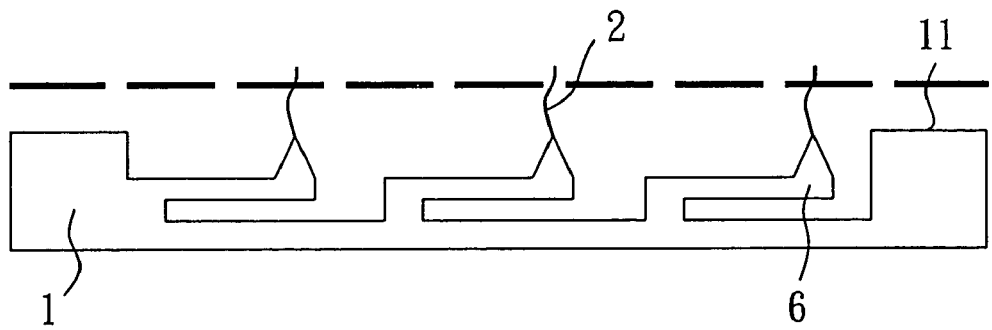

The array of carbon nanotube probes used in the present invention employs the conventional microelectromechanical technology to form the microstructure thereof. Referring to FIG. 1, an array of probes 3 having carbon nanotubes 2 is formed on a p-type wafer, an n-type wafer, a glass substrate or the like substrate 1 by chemical vapor deposition, plasma-enhanced chemical vapor deposition or field-enhanced chemical vapor deposition. In addition to the carbon nanotubes 2 grown on the end of the cantilever 6, they can be grown on a pyramidal-shaped tip 7 in appropriate embodiments, as shown in FIG. 2. The probes 3 are designed to form on the bottom 4 under a reference level 5. Also, the end of the carbon nanotubes 2 is designed to be grown within a distance from zero to several microns from the reference level 5 below, depending on the application of the probes. A groove-shaped structure is used to reduce the possibility of impact on and damage to the probe end caused by a discharging electrode.

Figure 3:
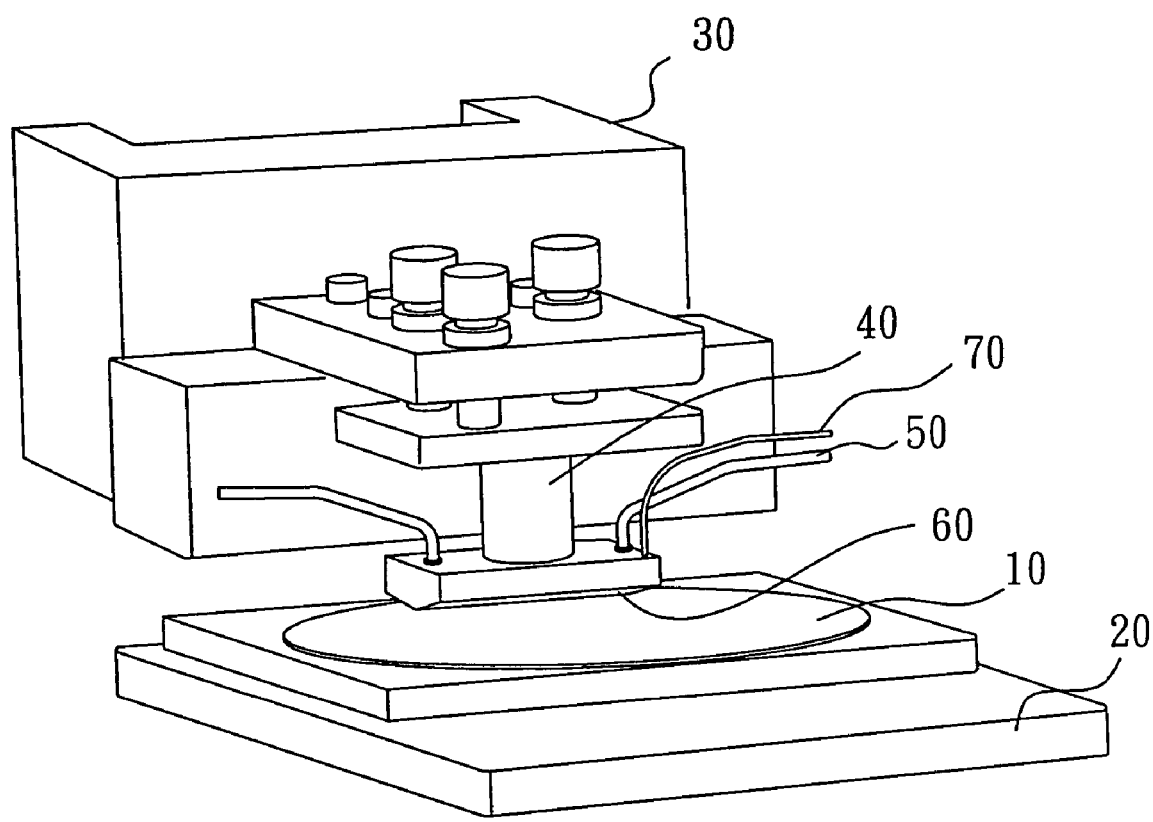
FIG. 3 is a perspective view of an apparatus for controlling the length of a carbon nanotube according to the preferred embodiment of the present invention.
Figure 4:
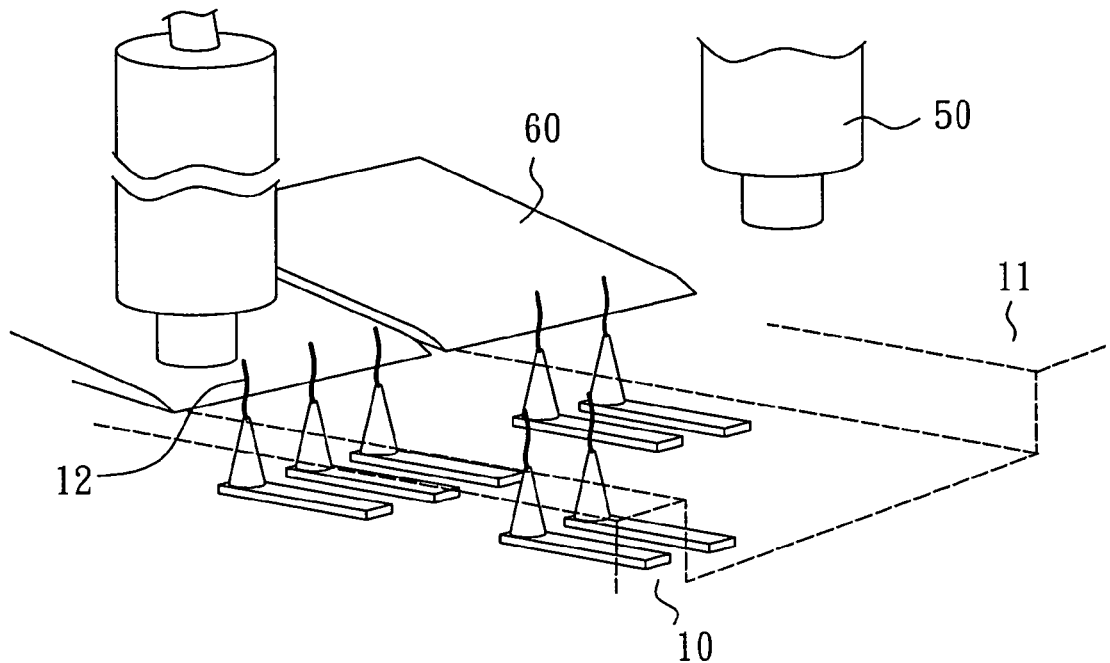
FIG. 4 is an enlarged structural view of a silicon wafer substrate, a position sensor and a discharging electrode according to the preferred embodiment of the present invention.

Referring now to FIG. 3, the apparatus of the present invention comprises an XY-dimensional positioning platform 30, a Z-dimensional positioning platform 20, a piezoelectric actuator 40, a position sensor 50, a discharging electrode 60, an electrode power line 70, and a silicon wafer substrate 10 having an array of carbon nanotube probes. FIG. 4 is an enlarged view of the structure of the silicon wafer substrate 10, the position sensor 50 and the discharging electrode 60, to facilitate the understanding of the relative position between the discharging electrode 60 and the carbon nanotube 2 as well as the way of cutting. The discharging electrode 60 can be a planar or a wire electrode, having an angle with respect to a reference level 11. In general, the angle is in the range of from about zero to 15 degrees, depending on the microscopic angle of the discharging electrode.

During the movement of the XY-dimensional positioning platform 20, if the undulation on the substrate 10 carried above the XY-dimensional positioning platform 20 with respect to the discharging electrode 60 is less than one-half micron, the control steps are as follow: moving the substrate 10 to an appropriate position with the XY-dimensional positioning platform 20; applying 1 volt to 5 volts DC voltage to the discharging electrode 60; coordinating the Z-dimensional positioning platform 30 and the piezoelectric actuator 40 to lower the discharging electrode 60 toward the reference level 11 and monitoring the potential of the discharging electrode 60; calibrating the height of the discharging electrode 60 until the discharging electrode 60 and the silicon wafer substrate 10 become electrically conductive; moving the discharging electrode 60 to a position of several microns above the reference level 11 with the Z-dimensional positioning platform 30 and further moving the discharging electrode 60 to a position in the range of from hundreds nanometers to one micron above the reference level 11 with the piezoelectric actuator 40; and moving the substrate 10 with the XY-dimensional positioning platform 20 and simultaneously supplying a pulse in the range of from 3.6 volts to 20 volts per 50 microseconds to the discharging electrode 60 to cut the carbon nanotube 12 by discharge, as shown in FIG. 4.

Figure 5:
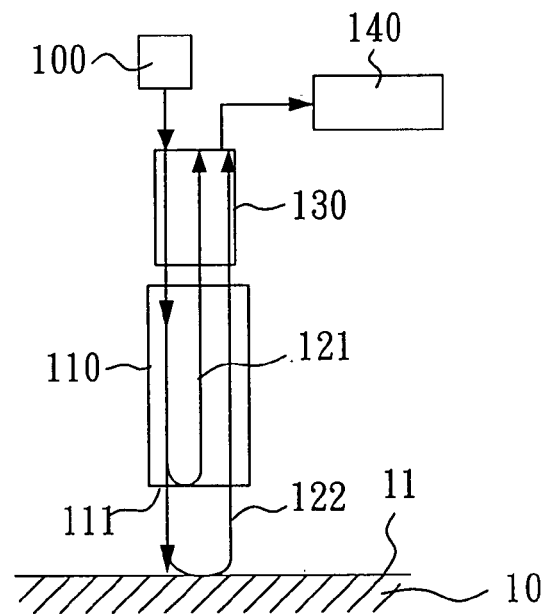
FIG. 5 is schematic view of a position sensor according to the preferred embodiment of the present invention, wherein an interferometer is used for control.

During the movement of the XY-dimensional positioning platform 20, if the undulation on the substrate 10 carried on the XY-dimensional positioning platform 20 with respect to the discharging electrode 60 is more than one-half micron, a close-looped control can be used with the position sensor 50. The position sensor 50 may be a capacitance-type sensor or an optical fiber interferometer. The preferred embodiment of the present invention uses the optical fiber interferometer for control as illustrated. Referring to FIG. 5, a laser light source 100 guided by an optical fiber 110 is projected on a reflecting plane of the reference level 11. A first reflected light 121 from a cross-section 111 of the optical fiber and a second reflected light 122 from the reflecting plane into the optical fiber are directed to a photoelectric sensor 140 with an optical coupler 130 or other optical lenses. An electrical signal is obtained by transformation of the optical interference between the first reflected light 121 and the second reflected light 122 with the photoelectric sensor 140. The amplitude of the optical interference is subject to the distance between the cross-section 111 of the optical fiber and the reflecting plane of the reference level 11. As such, the position of the optical fiber 110 or of the substrate 10 can be calibrated longitudinally to maintain not only the amplitude of the optical interference but also maintain the distance between the cross-section 111 of the optical fiber and the reflecting plane of the reference level 11 constant. The distance can be predetermined in the range of from hundreds nanometers to 40 microns so that the optical fiber 110 can take sufficient reflection energy. The positional displacement of the discharging electrode 60 with respect to the reference level 11 at the predetermined position can be controlled within a quarter wavelength of the laser. If the energy of the laser interference changes, the distance between the cross-section 111 of the optical fiber and the reflecting plane of the reference level 11 is calibrated with the piezoelectric actuator 40 to maintain the amplitude of interference constant. Hence, the distance between the discharging electrode 60 and the reference level 11 is controlled.

The piezoelectric actuator 40 as described above is a stacked piezoelectric actuator having one-dimensional freedom of actuation in the Z direction or a piezoelectric tube actuator having more than one-dimensional freedoms of actuation. Further, it is possible for the discharging electrode 60 to be disposed on the tilt. Hence, two optical fiber interferometers can be used as the position sensors to calibrate the piezoelectric tube actuator and compensate the tilted disposition of the discharging electrode.

Although the present invention has been explained in relation to its preferred embodiment, it is to be understood that many other possible modifications and variations can be made without departing from the spirit and scope of the invention as hereinafter claimed.

What is claimed is:

1. A method for controlling the length of a carbon nanotube, comprising the following steps:

providing a substrate having a first surface on which an array of microstructures is disposed wherein at least one carbon nanotube is formed on at least one microstructure, and at least a second surface forming a reference level, wherein the shortest vertical distance of the top of said at least one carbon nanotube above said reference level is H;

providing at least one positioning platform capable of carrying and moving said substrate;

mounting said substrate onto said positioning platform;

providing a discharging electrode and a piezoelectric actuator which positions said discharging electrode;

providing a position sensor for detection of the height of said discharging electrode relative to said reference level to calibrate the position of said substrate or said discharging electrode in accordance with the height sensed with said position sensor, wherein the vertical distance of said discharging electrode above said reference level is I; and moving said substrate with said positioning platform and simultaneously applying a voltage pulse to said discharging electrode, wherein H is not less than I such that said discharging electrode cuts the at least one carbon nanotube.

2. The method of claim 1, wherein said positioning platform is an XY-dimensional positioning platform.

3. The method of claim 1, wherein said positioning platform further comprises a Z-dimensional positioning platform.

4. The method of claim 2, wherein said substrate is a silicon wafer substrate or glass substrate.

5. The method of claim 1, wherein said discharging electrode is a planar or a wire electrode.

6. The method of claim 5, wherein said discharging electrode has an angle in the range of from zero to 15 degrees with respect to said substrate surface.

7. The method of claim 1, wherein said carbon nanotubes are formed on said substrate by chemical vapor deposition (CVD), plasma-enhanced chemical vapor deposition (PECVD) or field-enhanced chemical vapor deposition (FECVD).

8. The method of claim 1, wherein said position sensor is an interferometer, a capacitance-type sensor or a probe-type sensor.

9. The method of claim 1, wherein said voltage pulse applied to said discharging electrode is in the range of from 3.6 volts to 20 volts, and the period of said voltage pulse is in the range of from 30 to 100 microseconds.

* * * * *